(12) United States Patent
Stoney

(10) Patent No.: US 9,188,234 B2
(45) Date of Patent: Nov. 17, 2015

(54) VALVE

(71) Applicant: Andrew John Stoney, Ashbourne (GB)

(72) Inventor: Andrew John Stoney, Ashbourne (GB)

(73) Assignee: AES Engineering Ltd., Rotherman (GB)

( * ) Notice: Subject to any disclaimer, the term of this patent is extended or adjusted under 35 U.S.C. 154(b) by 225 days.

(21) Appl. No.: 13/753,348

(22) Filed: Jan. 29, 2013

(65) Prior Publication Data

US 2014/0209183 A1   Jul. 31, 2014

(30) Foreign Application Priority Data

Jan. 30, 2012   (GB) .................................. 1201491.6

(51) Int. Cl.
 *F16K 17/36*   (2006.01)
(52) U.S. Cl.
 CPC ........... *F16K 17/36* (2013.01); *Y10T 137/1842* (2015.04)
(58) Field of Classification Search
 CPC ............. F16K 7/07; F16K 7/075; F16K 7/17; F16K 17/36; F16K 31/126; F16K 31/1262; F16K 31/1264; F16K 31/1266; F16K 31/1268; F16K 31/16; F16K 31/165; F16K 31/365; F16K 31/385; Y10T 137/1842
 USPC .......... 137/78.1, 81.1, 81.2, 87.04, 100, 529, 137/540, 561 A, 563, 594, 624.27; 251/28, 251/61.4, 61.5, 123, 170, 331
 See application file for complete search history.

(56) References Cited

U.S. PATENT DOCUMENTS

| | | | | |
|---|---|---|---|---|
| 2,382,625 A * | 8/1945 | Garretson | .................... | 261/69.2 |
| 2,705,046 A * | 3/1955 | Schroeder | ....................... | 60/243 |
| 2,867,227 A * | 1/1959 | Meidenbauer | ............... | 137/81.1 |
| 3,493,005 A * | 2/1970 | Kakegawa | .................... | 137/100 |
| 3,698,412 A * | 10/1972 | Smyly | .......................... | 137/81.1 |
| 4,020,861 A * | 5/1977 | Shihabi | ........................ | 137/100 |
| 5,829,473 A * | 11/1998 | Hajbi et al. | .............. | 137/315.28 |
| 6,341,758 B1 * | 1/2002 | Shih et al. | ..................... | 251/63.4 |
| 7,647,941 B2 * | 1/2010 | Onoe | ............................ | 137/489 |
| 2010/0294970 A1 * | 11/2010 | Re | ................................. | 251/322 |

* cited by examiner

*Primary Examiner* — Craig Schneider
*Assistant Examiner* — Frederick D Soski
(74) *Attorney, Agent, or Firm* — Edwin D. Schindler

(57) ABSTRACT

A valve includes a housing having a fluid inlet and a fluid outlet defines a fluid flow path between the fluid inlet and the fluid outlet. A device is included for restricting the flow between the inlet and the outlet which has a fixed flow restriction device for applying a pre-determined counter-flow pressure and a device for applying an additional counter-flow pressure according to the pressure in an environment external to the valve.

13 Claims, 5 Drawing Sheets

SECTION A-A

SECTION A-A

VALVE

BACKGROUND OF THE INVENTION

1. Technical Field of Invention

The present invention relates generally to valves which may be used with mechanical seals.

More particularly, the present invention relates to a preferred, but not exclusive, application of the invention is to double mechanical seals in which a barrier or buffer fluid is used to lubricate and cool the components within the seal.

Reference will be made herein to mechanical seals and seal support systems, although it should be understood that valves of the invention have other applications.

2. Description of the Prior Art

A seal support system includes a vessel or tank containing a volume of fluid. The vessel is in piped connection to a mechanical seal which may be arranged to provide a seal within a pump or other item of rotating equipment. Normally, a return pipe extends from the mechanical seal back to the vessel. The resultant fluid loop is such that the fluid, contained within the vessel, may enter and exit the sealing device. Where a relatively large amount of heat is generated within the mechanical seal, a forced circulation system may be employed. In such a system barrier fluid is forced through the seal from the vessel by means of a pump and is then fed back to the vessel where the barrier fluid cools.

The AESSEAL PUMPPAC (registered trademark of AES Engineering Limited) is an arrangement which performs this task, having the ability to pressurise the barrier fluid being supplied to the mechanical seal. This ensures that, if there is any leakage across the seal face, it is always the barrier fluid which leaks in to the product, rather than the product (which may be hazardous to the environment) in to the atmosphere/vessel.

Typically the pressure of the barrier fluid is set 1 bar above that of the process fluid to ensure that, should leakage occur, it is in the manner indicated above.

It is known to provide a valve within the system in order to reduce the flow of barrier fluid to the seal when a pre-determined pressure difference is detected. However, if the product pressure varies but the back pressure applied to the barrier fluid is set at a fixed level, then excessive pressure within the mechanical seal may result in the seal having to work harder than is necessary, thereby causing the seal to deteriorate at a relatively fast rate.

SUMMARY OF THE INVENTION

According the present invention, there is provided a valve comprising a housing having a fluid inlet and a fluid outlet, the housing defining a fluid flow path between said fluid inlet and said fluid outlet, the valve further comprising means for restricting the flow between said fluid inlet and said fluid outlet, said means comprising fixed flow restriction means for applying a pre-determined counter-flow pressure and means for applying an additional counter-flow pressure according to the pressure in an environment external to said valve.

The environment external to the valve may be, for instance, the product fluid of a mechanical seal Preferably, the fixed flow restriction means comprises flow path blocking means moveable between more and less flow restricting positions and means for urging said blocking means towards a more flow restricting position.

Preferably the blocking means comprises a diaphragm mounted within the housing and resiliently deformable between said flow restricting positions.

Preferably, the urging means comprises a plate mounted so as to engage said diaphragm and a spring mounted to urge said plate towards said diaphragm.

Preferably, said additional counter-flow pressure applying means comprises means for applying said external pressure to said flow path blocking means.

Preferably, said means for applying said external pressure comprises means for connecting the housing to said source of additional pressure and means for transmitting the external pressure within the housing to said flow path blocking means.

Preferably, said transmission means comprises a fluid pressure communicating passage within the housing and extending from the connecting means to the flow blocking means.

Preferably, means are provided within said passage for isolating said source of external pressure from said fluid flow path.

Preferably, said isolating means comprises a resiliently deformable diaphragm.

Preferably, said pressure communicating passage includes said means for urging said blocking means.

Preferably, the housing is provided with means for feeding a pressure relaying fluid to said communicating passage.

Preferably, the housing comprises a first component within which is located said fluid flow path and said fixed flow restriction means and a second component, detachably securable to said first component, within which is located said connecting means.

Preferably, said first component comprises a first portion within which is located said fluid flow path and a second portion, detachably securable to said first portion, within which is located said means for applying said pre-determined counter-flow pressure.

Preferably, said second portion includes said means for feeding said pressure transmitting fluid to said pressure communication passage.

The present invention also provides a device for providing forced circulation of barrier fluid to a mechanical seal, the device including fluid pumping means and a valve of the invention.

Furthermore, the present invention provides a barrier fluid supply arrangement for a mechanical seal, the arrangement comprising such a device and a vessel for accommodating barrier fluid.

In addition, the present invention comprises a mechanical seal assembly and the barrier fluid supply arrangement of the invention.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1:
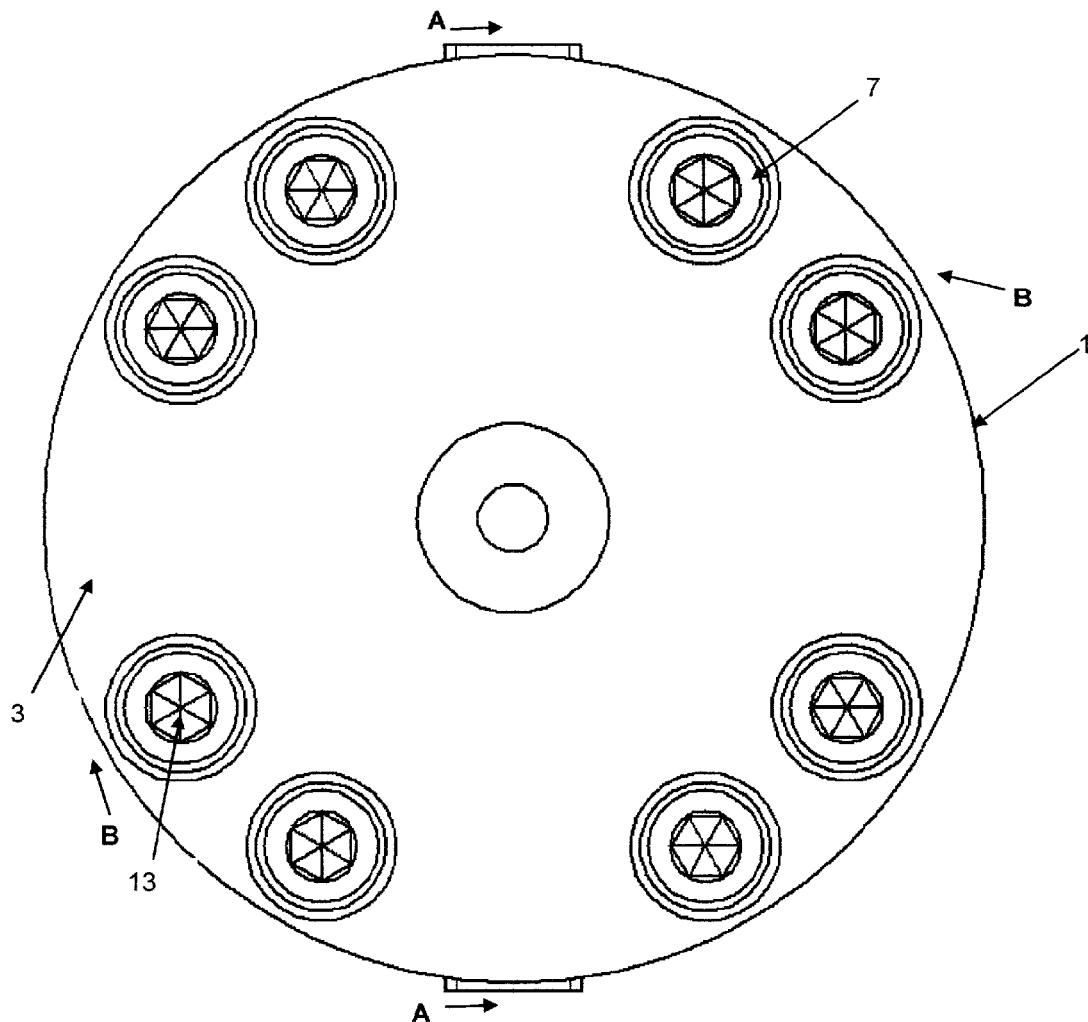
FIG. 1 is an end elevation of a valve in accordance with the present invention.
Figure 2:
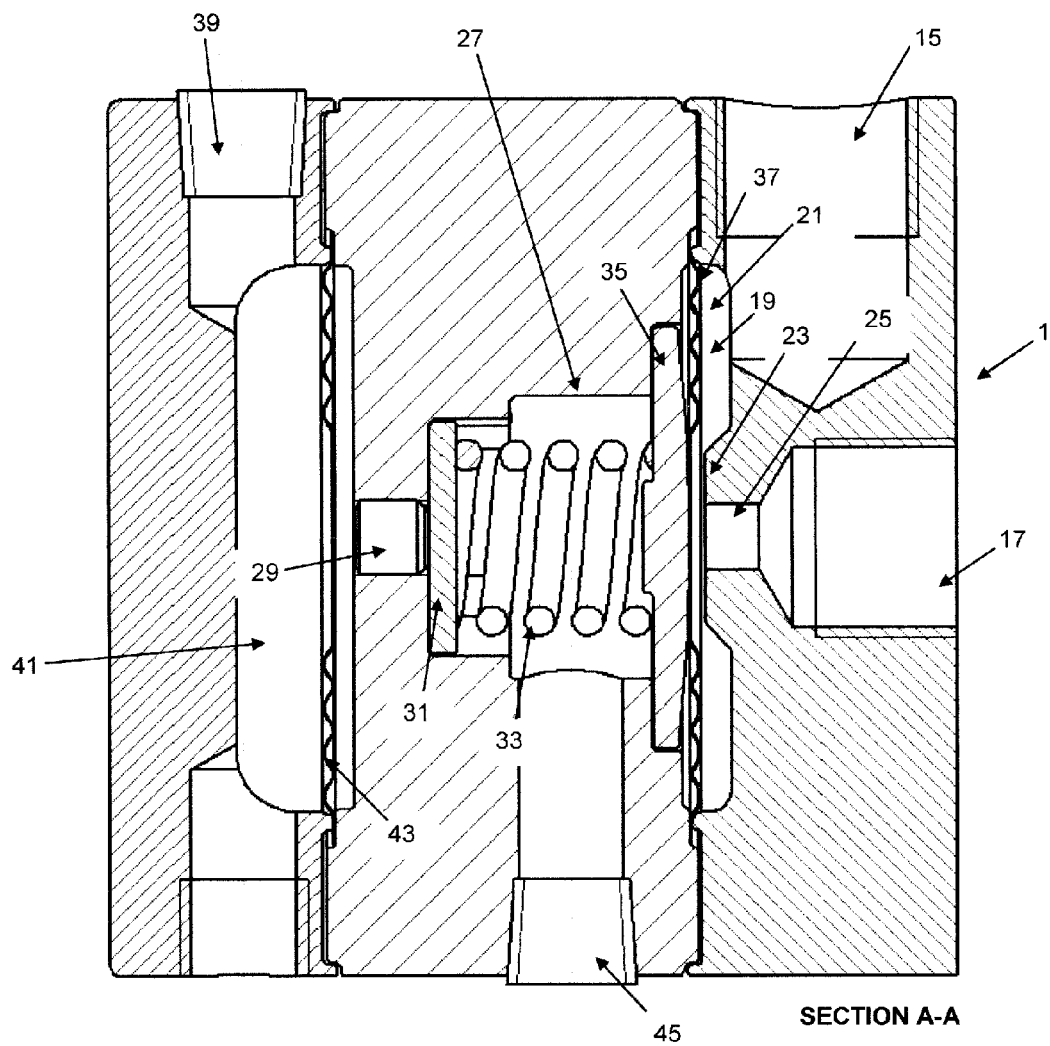
FIG. 2 is a longitudinal section of the valve of FIG. 1 taken on line A-A.
Figure 3:
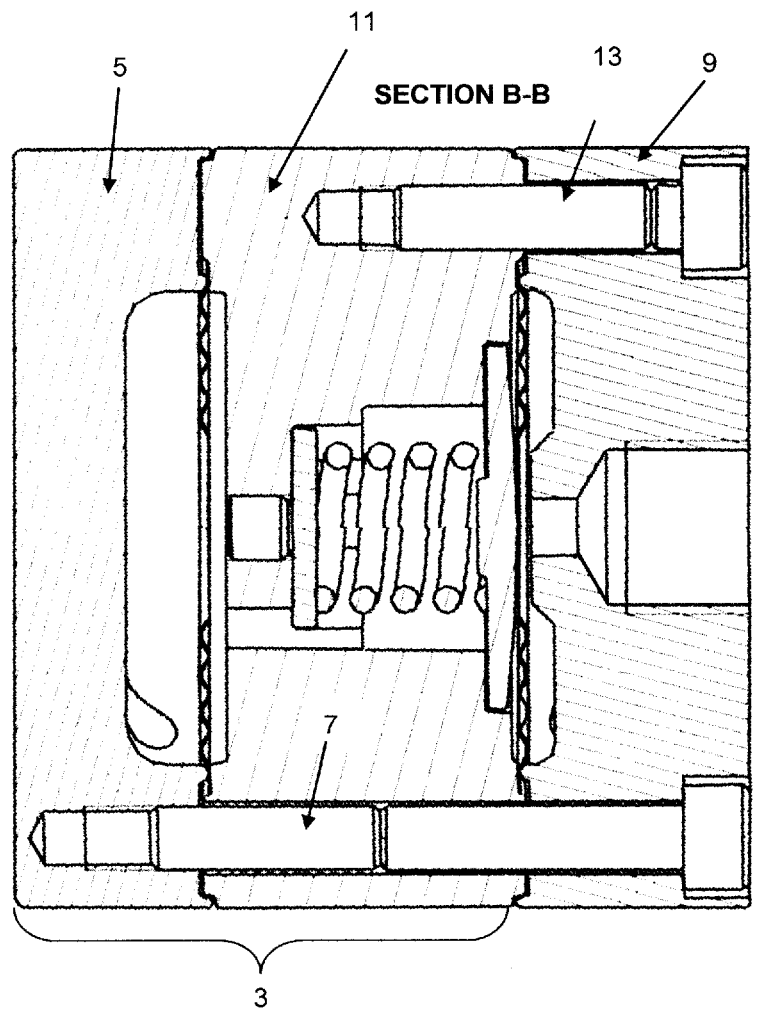
FIG. 3 is a longitudinal section of the valve of FIG. 1 taken on line B-B.
Figure 4:
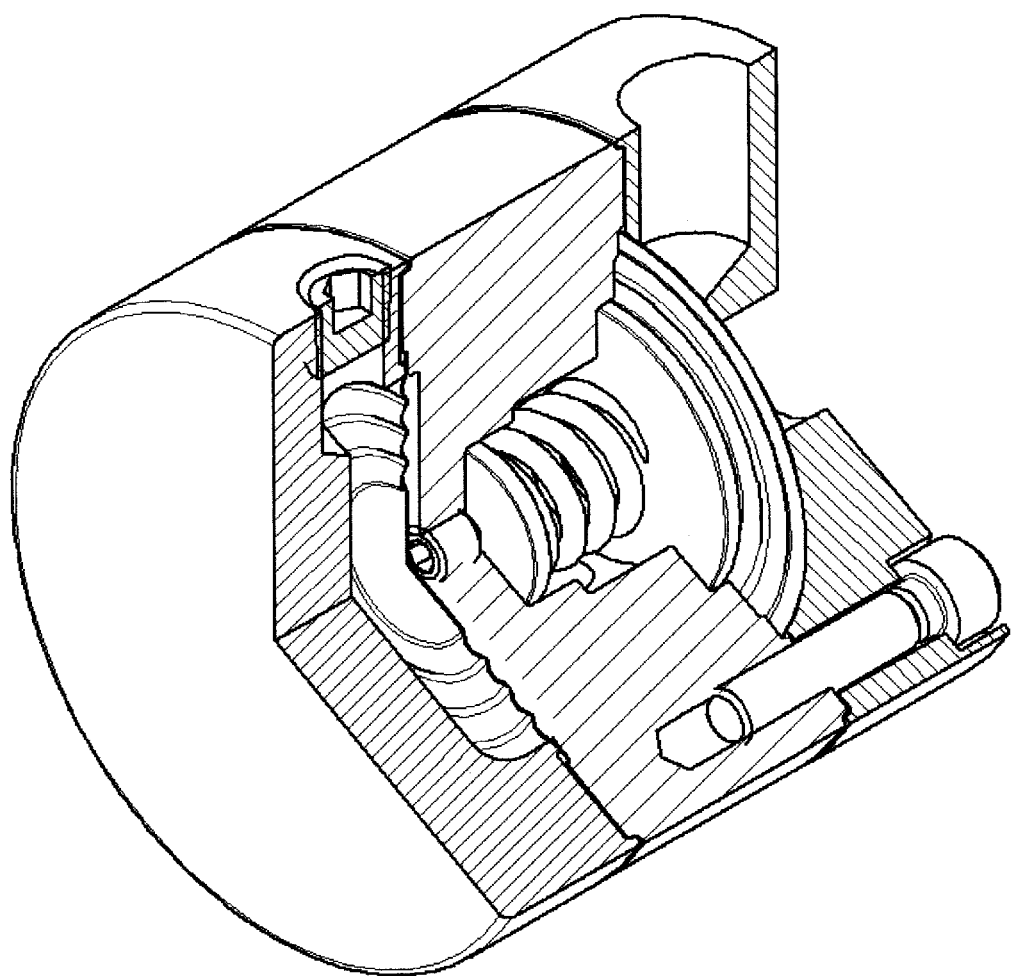
FIG. 4 is a partially cut-away perspective view on one end of the valve of FIG. 1.
Figure 5:
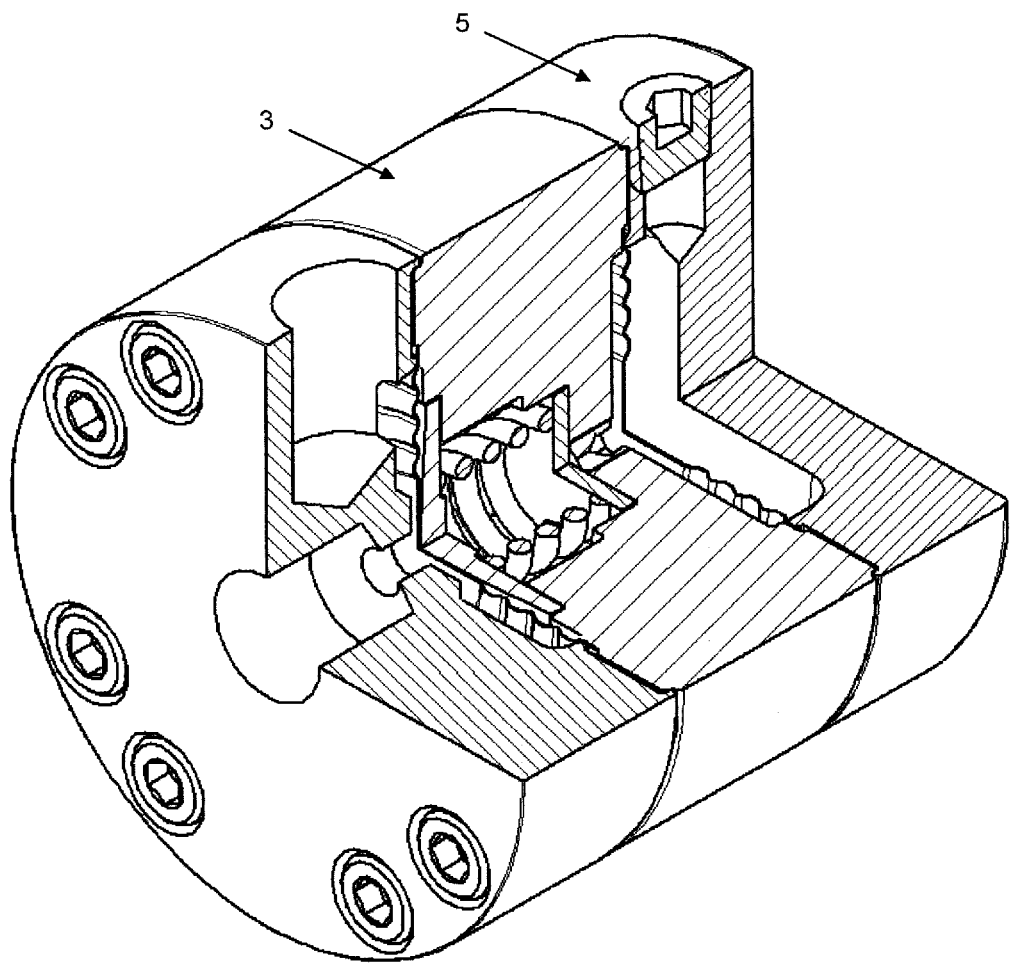
FIG. 5 is a partially cut-away perspective view on the other end of the valve of FIG. 1.

The present invention will now be described, by way of example only, with reference to the accompanying drawings.

The valve illustrated in the accompanying drawings is designed to operate in conjunction with a double mechanical seal and a constant flow (pumped) barrier fluid system. The purpose of the valve is to provide a back pressure for the barrier fluid which is a fixed amount (bias) greater than that of the product being sealed by the mechanical seal.

The valve comprises a housing 1 which comprises two components 3 and 5 which are detachably secured together by means of screws 7. Component 3 comprises two portions 9 and 11 which are detachably secured together by means of screws 13.

As shown in the accompanying drawings, the valve is generally of circular and cylindrical shape.

Portion 9 of component 3 is the main body of the valve. Portion 11 of component 3 is termed the end cap and component 5 is termed the isolation cap.

Within main body 9 there is located an inlet 15 to which a pipe may be connected for feeding fluid to the valve from a double mechanical seal. Main body 9 is also provided with a fluid outlet 17. Between fluid inlet 15 and fluid outlet 17 is a void 19 which is a large circular recess in the internal end of body 9. This recess includes a relatively deep annulus 21 and a shallow central portion 23 through which extends short bore 25 connecting with outlet 17. Together inlet 15, void 21, short bore 25 and outlet 17 provide a fluid flow path for barrier fluid within housing 1.

Referring now to end cap 11, there is, extending centrally therethrough a stepped bore 27. Within bore 27 there is mounted a grub screw 29, a spacer disc 31, a compression spring 33 and a stop plate 35, the latter being located at that end of end cap 11 which is adjacent to main body 9. Stop plate 35 has a slightly convex face on that side closer to main body 9.

Between main body 9 and end cap 11, there is mounted a diaphragm 37 which is a circular disc corrugated over an outer annular portion but substantially flat over a central portion where it contacts the corresponding central portion of diaphragm 37. Spring 33 urges stop plate 35 towards diaphragm 37 and the central portion of diaphragm 37 towards central bore 25 of main body 9. In the absence of any opposing force, the resiliently deformable center of diaphragm 37 will engage the opening of short bore 25 thereby closing the fluid flow path. However, if sufficient opposing pressure is applied the center of diaphragm 37 by barrier fluid located within the fluid flow path, then the center of diaphragm 37 will move in a direction towards spring 33 thereby opening the fluid flow path.

The pressure applied by spring 33 may be adjusted by means of the screw 29 causing spacer 31 to be moved in a direction towards diaphragm 35.

Accordingly, the fluid entering void 21 must overcome the force being applied to diaphragm via outlet 17. Since the fluid is being forced into the valve at a constant rate, the pressure in the void 21 builds until the resultant force on the diaphragm balances that from spring 33. At this point the diaphragm deflects away from short bore 25 allowing fluid to flow into outlet 17. The pressure at which this flow occurs is the desired fixed biased pressure for the mechanical seal barrier system.

The isolation cap 5 includes one or more seal chamber reference ports 39 which may be connected via pipe work to the product fluid being contained by the mechanical seal. Port 39 connects, within cap 5 to a central recess 41 in that end of cap 5 adjacent end cap 11. This connection allows the product/application pressure to act as an additional force applied to diaphragm 37. As a result the total back pressure is now the sum of the force of spring 33 and that of the product pressure. The pressure therefore to be overcome by the barrier fluid is dependent on the product pressure and the presence of an excess pressure within the barrier fluid is thereby avoided.

It may be that it is appropriate or necessary to isolate the product fluid from the rest of the valve assembly, for instance, if the product is corrosive or otherwise detrimental to the operation (or cost) of the valve. In this case a diaphragm 43, generally similar to diaphragm 37, is mounted between isolation cap 5 and end cap 11 so as to extend across recess 41. In this way product fluid is isolated within isolation cap 5 and does not come into contact with the rest of the valve. The isolator cap 5 and the diaphragm 43 may be made of a material which can, for instance, withstand corrosive effects of the product fluid. The end cap 11 is provided with an inlet 45 which extends from the outer cylindrical surface of the housing to the central bore 27. In the case where the product fluid is isolated within isolation cap 5, an inert incompressible transfer fluid supplied via inlet 45 may fill the voids between diaphragm 43 and plate 35. Accordingly the product pressure is relayed (transferred) from the isolation diaphragm 43 to pressure control diaphragm 37 via the transfer fluid.

Accordingly to the above described valve provides an automatically variable back pressure control within a forced circulation barrier system. The back pressure is varied relative to the pressure of the seal product and therefore the barrier fluid pressure does not rise so far above that of the seal product that unnecessary wear and tear is caused to the seal.

An advantage of the above described arrangement is that a pre-determined bias may be set by the manufacturer prior to attaching the isolation cap to the remainder of the valve.

Furthermore the isolator cap may be attached to the remainder of the valve either with or without the isolation facility described above, thereby providing a modular feature to the valve.

While only several embodiments of the present invention have been shown and described, it will be obvious to those skilled in the art that many modifications may be made to the present invention without departing from the spirit and scope thereof.

What is claimed is:

1. A valve comprising a housing having a fluid inlet and a fluid outlet, the housing defining a fluid flow path between said fluid inlet and said fluid outlet, the valve further comprising means for restricting the flow between said fluid inlet and said fluid outlet, said means comprising fixed flow restriction means for applying a pre-determined counter-flow pressure, said fixed flow restriction means comprises flow path blocking means movable between more and less flow restricting positions and means for urging said blocking means toward a more flow restricting position., and means for applying an additional counter-flow pressure according to the pressure in an environment external to said valve, said additional counter-flow pressure applying means comprises means for applying said external pressure to said flow path blocking means, wherein said means for applying external pressure comprises means for connecting the housing to said source of additional pressure and means for transmitting the external pressure within the housing to said flow path blocking means and with said means for transmitting comprising a fluid pressure communication passage within said housing and extending from said means for connecting to said flow path blocking means.

2. The valve according to claim 1, wherein the blocking means comprises a diaphragm mounted within the housing and resiliently deformable between said flow restricting positions.

3. The valve according to claim 1, wherein the urging means comprises a plate mounted for engaging said diaphragm and a spring mounted for urging said plate towards said diaphragm.

4. The valve according claim 1, wherein said fluid pressure communicating passage includes said means for urging said blocking means.

5. The valve according to claim 1, further comprising means for isolating said source of external pressure from said fluid flow path, said means for isolating being located within said fluid pressure communicating passage.

6. The valve according to claim 5, wherein said means for isolating comprises a resiliently deformable diaphragm.

7. The valve according to claim 5, wherein the housing includes means for feeding a pressure relaying fluid to said fluid pressure communicating passage.

8. The valve according to claim 1, wherein the housing comprises a first component within which is located said fluid flow path and said fixed flow restriction means and a second component, detachably securable to said first component, within which is located said means for connecting.

9. The valve according to claim 8, wherein said first component comprises a first portion within which is located said fluid flow path and a second portion, detachably securable to said first portion, within which is located said means for applying said pre-determined counter-flow pressure.

10. The valve according to claim 9, wherein said second portion includes said means for feeding said pressure transmitting fluid to said fluid pressure communicating passage.

11. A valve comprising a housing having a fluid inlet and a fluid outlet, the housing defining a fluid flow path between said fluid inlet and said fluid outlet, the valve further comprising means for restricting the flow between said fluid inlet and said fluid outlet, said means comprising fixed flow restriction means for applying a pre-determined counter-flow pressure, said fixed flow restriction means comprises flow path blocking means movable between more and less flow restricting positions and means for urging said blocking means toward a more flow restricting position, and means for applying an additional counter-flow pressure according to the pressure in an environment external to said valve, said additional counter-flow pressure applying means comprises means for applying said external pressure to said flow path blocking means, wherein said means for applying external pressure comprises means for connecting the housing to said source of additional pressure and means for transmitting the external pressure within the housing to said flow path blocking means, said housing further comprising a first component within which is located said fluid flow path and said fixed flow restriction means and a second component, detachably securable to said first component, within which is located said means for connecting, said first component comprising a first portion within which is located said fluid flow path and a second portion, detachably securable to said first portion, within which is located said means for applying said predetermined counter-flow pressure, said second portion including said means for feeding said pressure transmitting fluid to said fluid pressure communication passage.

12. The valve according to claim 11 wherein the blocking means comprises a diaphragm mounted within the housing and resiliently deformable between said flow restricting positions.

13. The valve according to claim 11, wherein said means for urging comprises a plate mounted for engaging said diaphragm and a spring mounted for urging said plate towards said diaphragm.

* * * * *